(12) United States Patent
Zeng et al.

(10) Patent No.: US 8,058,962 B2
(45) Date of Patent: Nov. 15, 2011

(54) CENTER-TAPPED TRANSFORMER (75) Inventors: Zhong Zeng, Taipei (TW); Xuezheng Ding, Taipei (TW); Limin Du, Taipei (TW); Xin Guo, Taipei (TW); Zhihong Ye, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 12/788,833

(22) Filed: May 27, 2010

(65) Prior Publication Data
US 2010/0231342 A1    Sep. 16, 2010

Related U.S. Application Data (63) Continuation-in-part of application No. 12/232,476, filed on Sep. 18, 2008, now abandoned.

(51) Int. Cl.
H01F 27/30 (2006.01)
(52) U.S. Cl. .......................... 336/208; 336/198
(58) Field of Classification Search .......... None
See application file for complete search history.

(56) References Cited

U.S. PATENT DOCUMENTS

| | | | | | |
|---|---|---|---|---|---|
| 4,857,877 | A | * | 8/1989 | Dethienne | 336/170 |
| 5,321,572 | A | * | 6/1994 | Shibui et al. | 361/38 |
| 5,696,477 | A | * | 12/1997 | Yamamori et al. | 336/192 |
| 6,346,870 | B1 | * | 2/2002 | Bill et al. | 336/198 |
| 7,229,042 | B2 | * | 6/2007 | Thebault et al. | 242/388.1 |
| 7,236,077 | B1 | * | 6/2007 | Hsu | 336/180 |
| 2002/0057179 | A1 | * | 5/2002 | Shimada et al. | 336/208 |

* cited by examiner

Primary Examiner — Anh Mai
(74) Attorney, Agent, or Firm — Rosenberg, Klein & Lee (57) ABSTRACT A center-tapped transformer includes a spool, a first primary winding unit, and first and second secondary winding units. The spool has a surrounding wall defining a spool axis, and a partition plate unit extending in radial outward directions from the surrounding wall so as to divide the spool into axially extending first and second spool parts. The partition plate unit cooperates with the surrounding wall to define at least one notch. The first primary winding unit surrounds the first spool part and passes through the notch to surround the second spool part. The first and second secondary winding units are disposed on one side of the first primary winding unit and surround the first and second spool parts, respectively.

8 Claims, 10 Drawing Sheets

CENTER-TAPPED TRANSFORMER

CROSS-REFERENCE TO RELATED APPLICATION

This is a continuation-in-part (CIP) of U.S. patent application Ser. No. 12/232476, filed on Sep. 18, 2008.

BACKGROUND OF THE INVENTION

1. Field of the Invention

The invention relates to a transformer, more particularly to a center-tapped transformer.

2. Description of the Related Art

Most electronic apparatus include a transformer as a core component to satisfy power transformation requirements. A transformer has an inherent leakage inductance. In particular, some magnetic lines of force generated when electricity is supplied to a primary winding do not pass through a secondary winding and thus do not generate corresponding electric current in the secondary winding. The leakage inductance is a measure of inductance of such magnetic lines of force (also called leakage flux).

In general, the leakage inductance of a transformer should be kept as small as possible. However, in some applications, the transformer is required to have a certain level of leakage inductance, such as when the leakage inductance is employed as a resonance inductance, or when the leakage inductance of a common-mode inductor is employed as a differential-mode inductance, etc.

Figure 1:
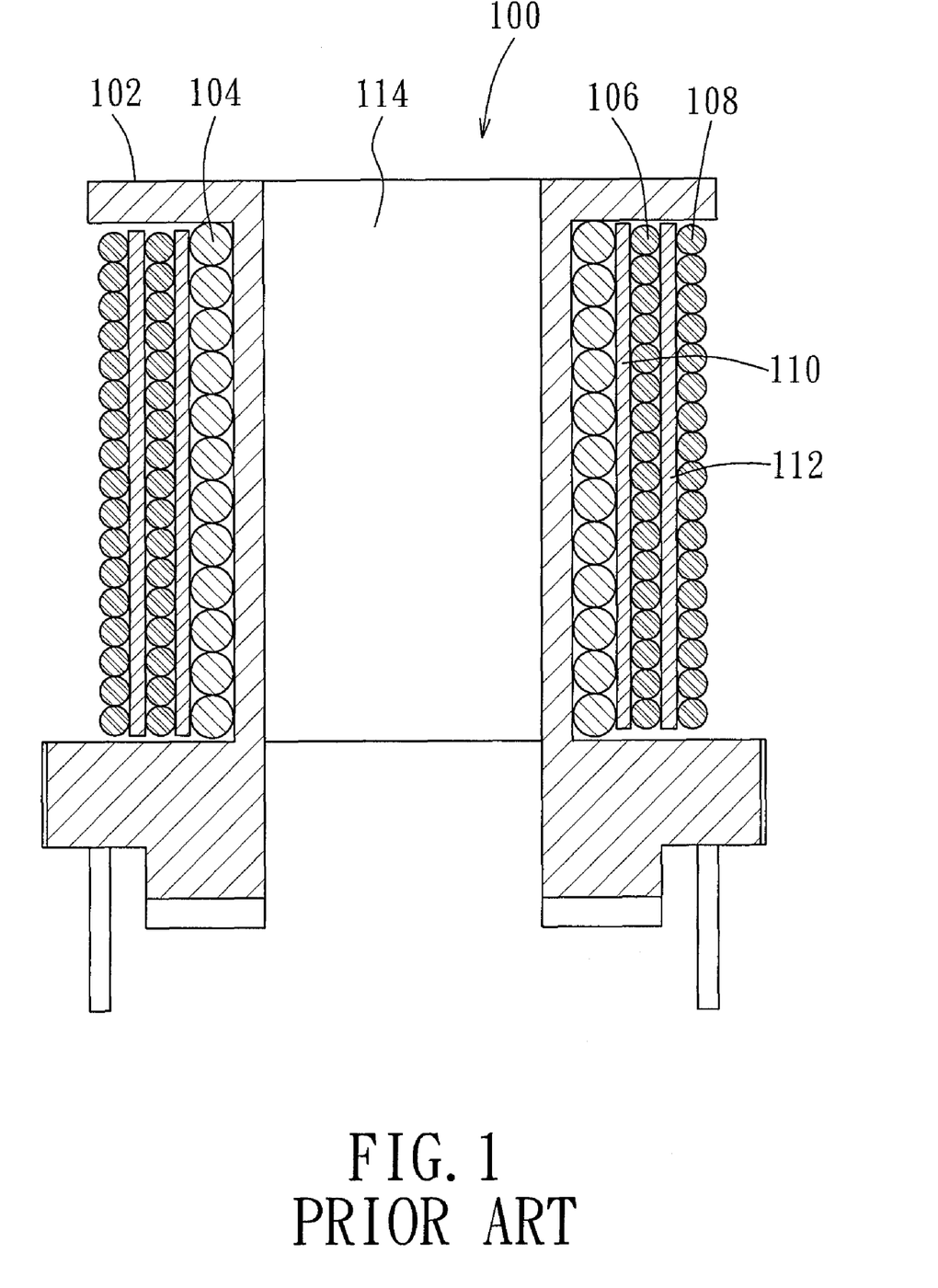
FIG. 1 is a sectional diagram of a conventional center-tapped transformer.

FIG. 1 is a sectional diagram of a conventional center-tapped transformer 100, which includes a tubular spool 102, a primary winding 104, a first secondary winding 106, a second secondary winding 108, a first isolating unit 110, a second isolating unit 112, and an iron core (not shown). The spool 102 is formed with a hollow portion 114 for extension of the iron core therethrough. The primary winding 104 is wound on the spool 102. The first secondary winding 106 is wound around the primary winding 104 and is spaced apart therefrom by the ring-shaped first isolating unit 110. The second secondary winding 108 is wound around the first secondary winding 106 and is spaced apart therefrom by the ring-shaped second isolating unit 112.

Figure 2A:
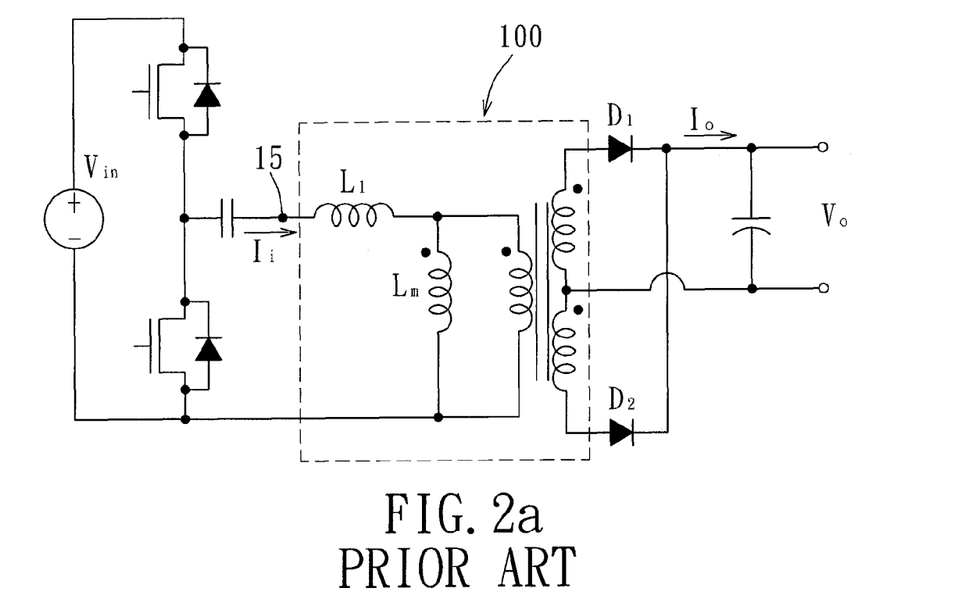
FIG. 2a is a circuit diagram of an asymmetric half-bridge LLC circuit including the transformer of FIG. 1.
Figure 2B:
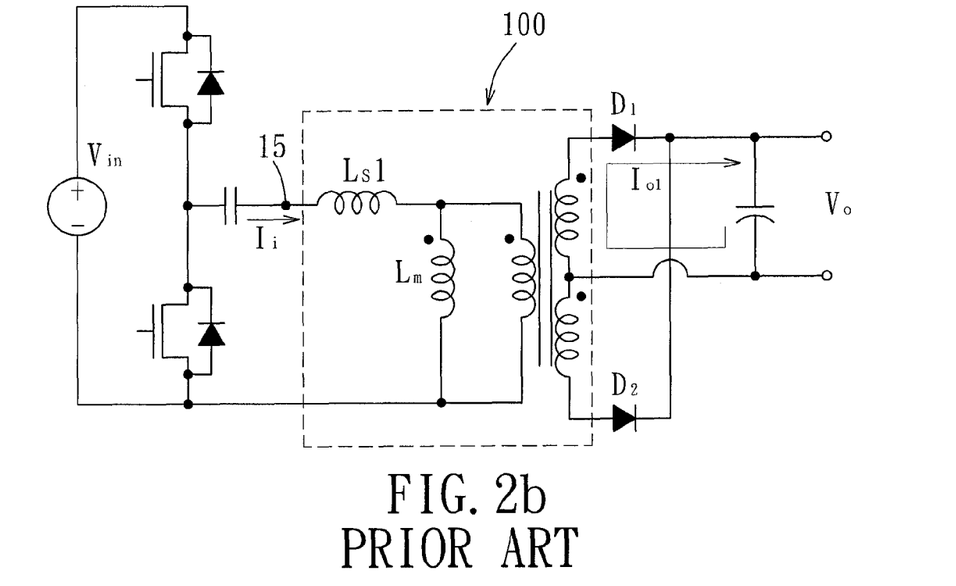
Figure 2C:
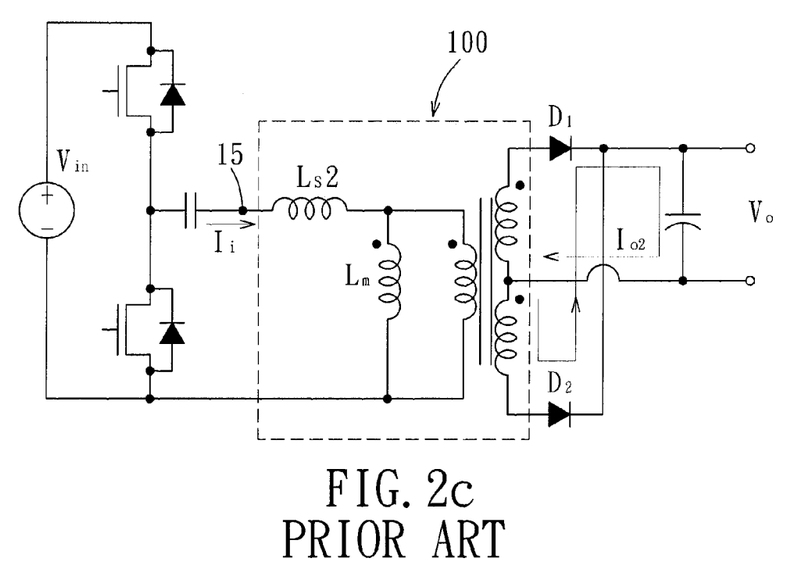

FIG. 2a is a schematic diagram of an asymmetric half-bridge LLC circuit including the transformer 100, wherein $(L_m)$ is the excitation inductance of the transformer 100 and $(L_1)$ is the leakage inductance of the primary winding 104. When a sinusoidal current $(I_i)$ (such as the waveform 101 in FIG. 2d) is inputted into the transformer 100 at a node 15 of the circuit, the circuit will output a rectified current $(I_o)$ (such as the waveform 103 in FIG. 2d). FIGS. 2b and 2c show two different working states of the asymmetric half-bridge LLC circuit, respectively. During a positive half-cycle of the waveform of the input current $(I_i)$, a diode $(D_1)$ conducts, a diode $(D_2)$ is cutoff, and the primary winding induces a leakage inductance $(L_{s1})$. On the other hand, during a negative half-cycle of the waveform of the input current $(I_i)$, the diode $(D_2)$ conducts, the diode $(D_1)$ is cutoff, and the primary winding induces a leakage inductance (Ls2). In theory, the values of the leakage inductances (Ls1) and $(L_{s2})$ should be close to each other in order for the circuit to work more efficiently and to reduce power loss.

Figure 2D:
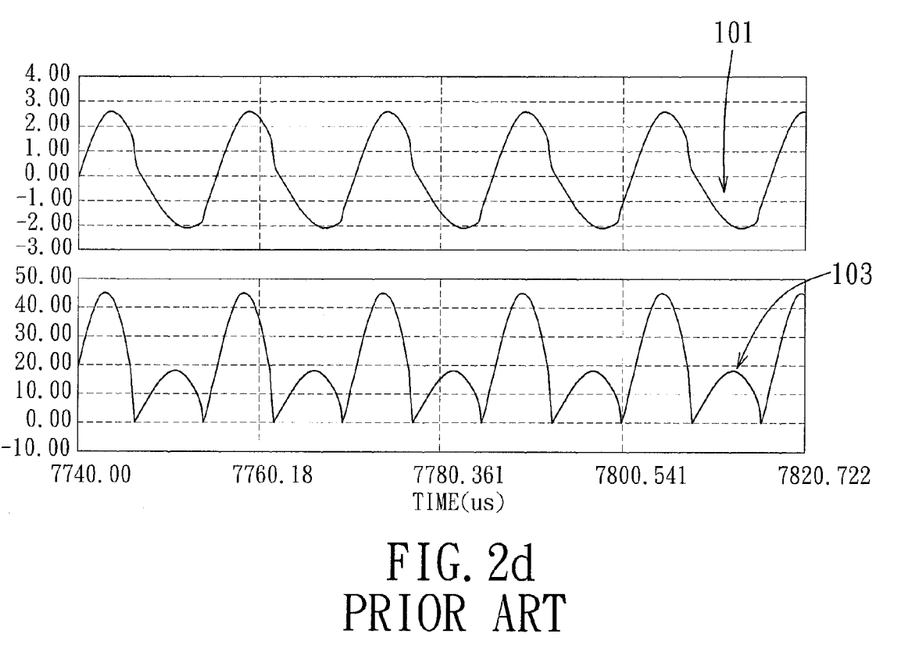

Since the leakage inductance $(L_1)$ of the primary winding 104 of the transformer 100 will vary with the change in the input current $(I_i)$, there is a relatively large difference between the values of the leakage inductances $(L_{s1})$ and $(L_{s2})$, which in turn results in non-uniform amplitude of the output current $(I_o)$, as evident from the waveform 103 in FIG. 2d. Due to the high and low peak values of the output current $(I_o)$, the circuit experiences larger power loss, thereby restricting applications of the transformer 100 and circuits employing the same.

Figure 3:
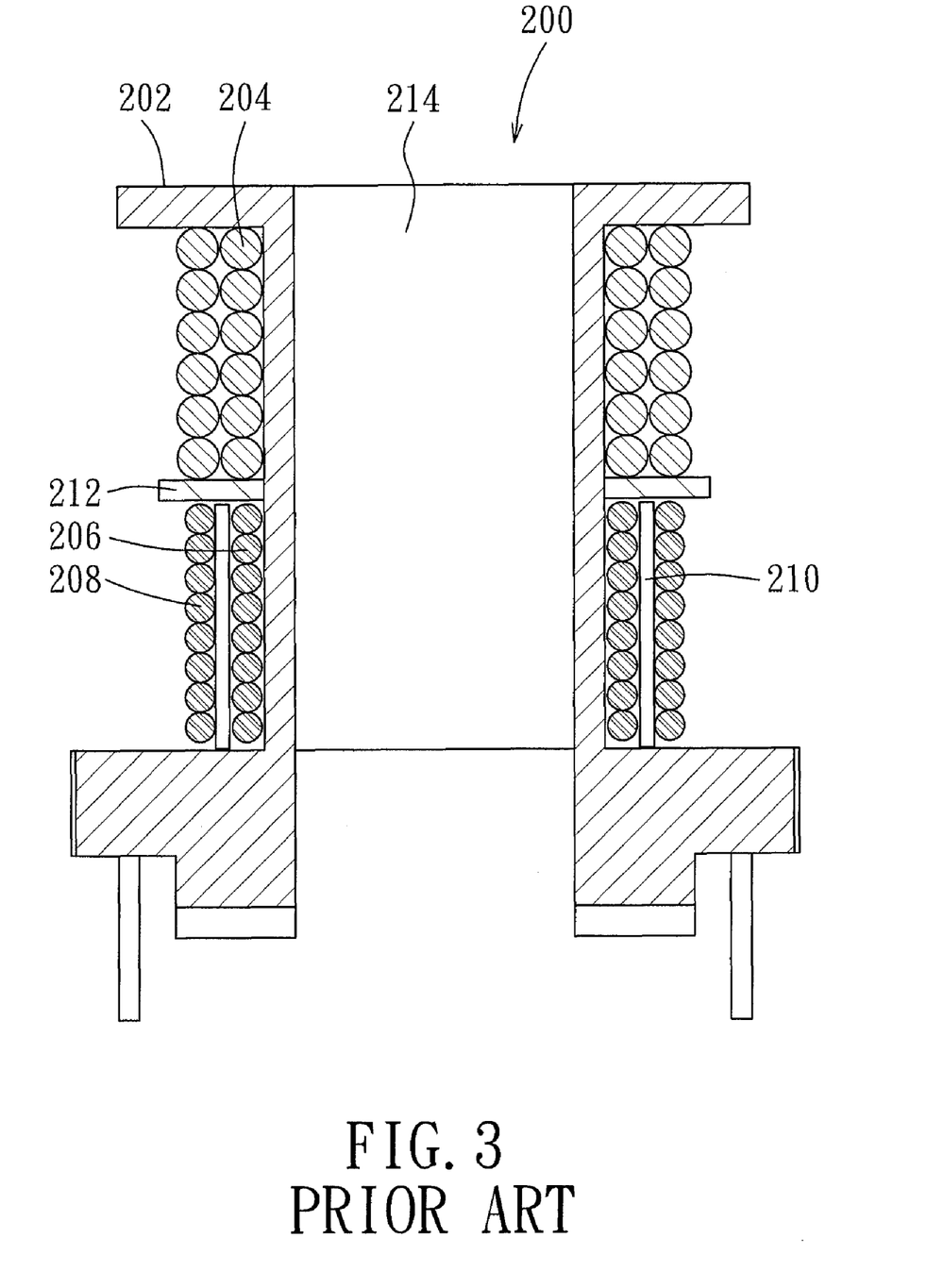
FIG. 3 is a sectional diagram of another conventional center-tapped transformer.

FIG. 3 is a sectional diagram of another conventional center-tapped transformer 200, which includes a tubular spool 202, a primary winding 204, a first secondary winding 206, a second secondary winding 208, a first isolating unit 212, a second isolating unit 210, and an iron core (not shown). The spool 202 is formed with a hollow portion 214 for extension of the iron core therethrough. The primary winding 204 is wound on an upper section of the spool 202. The first secondary winding 206 is wound on a lower section of the spool 202 and is spaced apart from the primary winding 204 by the ring-shaped first isolating unit 212. The second secondary winding 208 is wound around the first secondary winding 206 and is spaced apart therefrom by the ring-shaped second isolating unit 210.

Compared to the transformer 100 of FIG. 1, the leakage inductance of the primary winding 204 of the transformer 200 is maintained at a certain level for different circuit working states, and the insulation distance between the primary winding 204 and the first and second secondary winding units 206, 208 has a positive effect on safety specifications. Nevertheless, the leakage inductance of the transformer 200 and circuits employing the same is relatively large, which restricts applications of the same.

It is apparent from the foregoing that the conventional center-tapped transformers 100, 200 either have non-uniform leakage inductance or a rather large leakage inductance, which results in large circuit power loss and restricts applications of the same.

SUMMARY OF THE INVENTION

Therefore, the object of the present invention is to provide a center-tapped transformer that can overcome at least one of the abovementioned drawbacks of the prior art.

Accordingly, a center-tapped transformer of this invention comprises:

a spool having a surrounding wall that defines a spool axis, and a partition plate unit that extends in radial outward directions from the surrounding wall so as to divide the spool into axially extending first and second spool parts, and that cooperates with the surrounding wall to define at least one notch;

a first primary winding unit surrounding the first spool part and passing through the notch to surround second spool parts; and first and second secondary winding units disposed on one side of the first primary winding unit and surrounding the first and second spool parts, respectively.

BRIEF DESCRIPTION OF THE DRAWINGS

Other features and advantages of the present invention will become apparent in the following detailed description of the preferred embodiments with reference to the accompanying drawings, of which:

FIGS. 2b and 2c show two different working states of the asymmetric half-bridge LLC circuit of FIG. 2a;

FIG. 2d illustrates input and output current waveforms in the asymmetric half-bridge LLC circuit of FIG. 2a;

DETAILED DESCRIPTION OF THE PREFERRED EMBODIMENTS

Figure 4A:
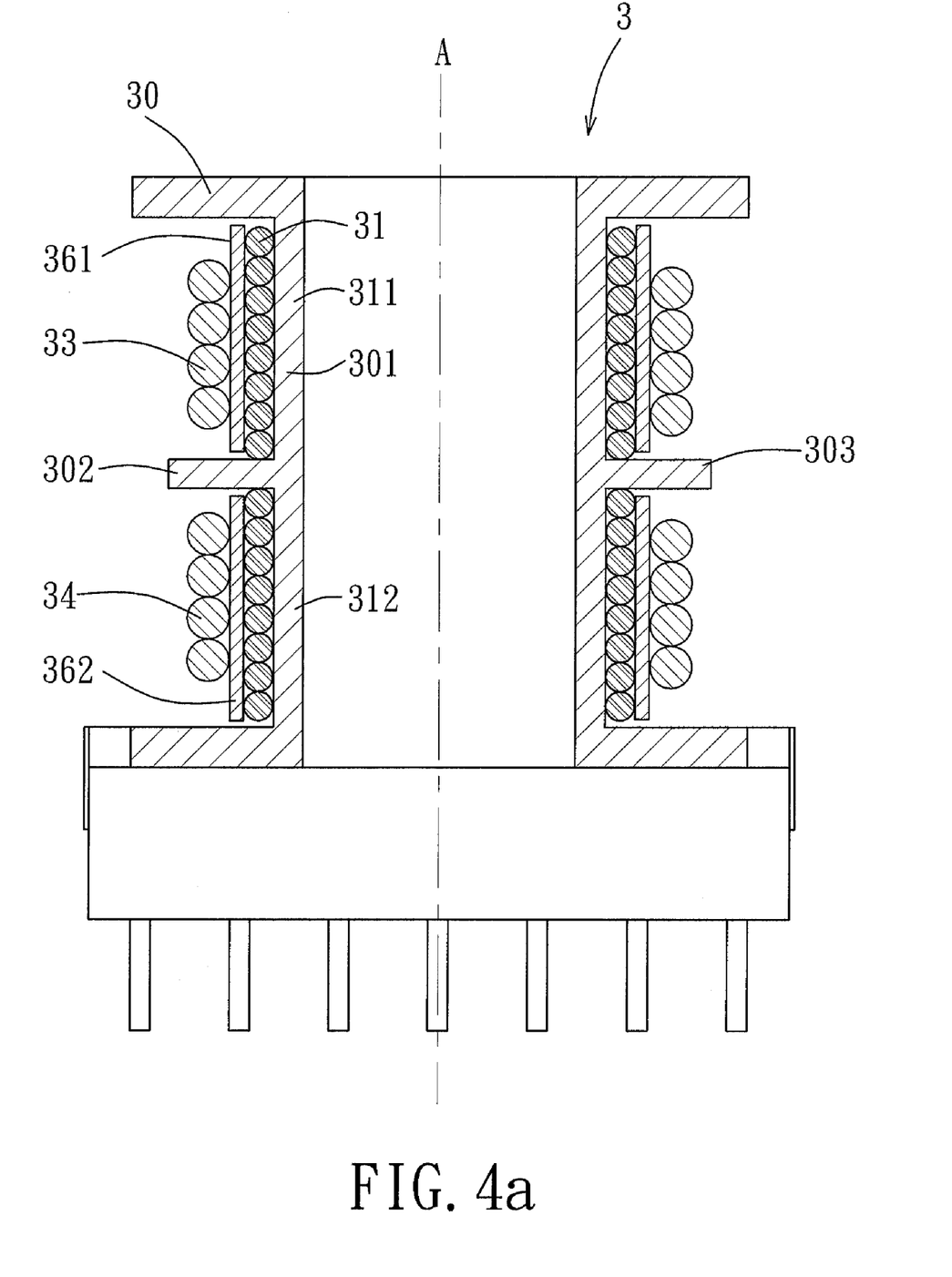
FIG. 4a is a sectional diagram of the first preferred embodiment of a center-tapped transformer according to the present invention.
Figure 4B:
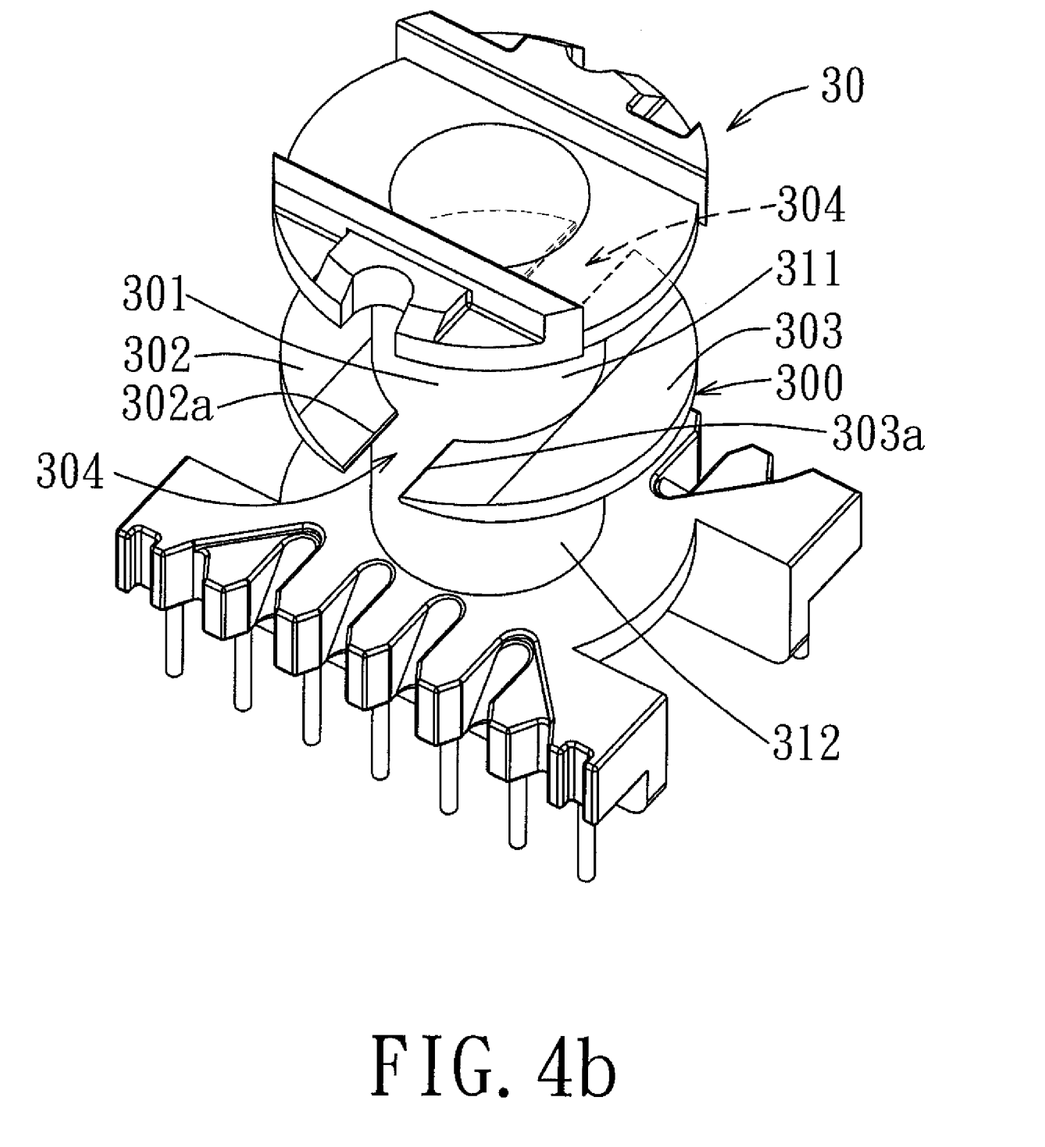
FIG. 4b is a perspective view of a spool of the first preferred embodiment.

Referring to FIGS. 4a and 4b, the first preferred embodiment of a center-tapped transformer 3 according to the present invention is shown to include a spool 30, a first primary winding unit 31, a first secondary winding unit 33, a second secondary winding unit 34, a first isolating unit 361, a second isolating unit 362, and an iron core (not shown).

The spool 30 has a surrounding wall 301 that defines a spool axis (A), and a partition plate unit 300 that extends in radial outward directions from the surrounding wall 301 so as to divide the spool 30 into axially extending first and second spool parts 311, 312. The partition plate unit 300 has first and second partition plate portions 302, 303 cooperating with the surrounding wall 301 to define a pair of notches 304 (see FIG. 4b) and surrounding a middle part of the surrounding wall 301 of the spool 30, and is transverse to an outer wall surface of the surrounding wall 301. In this embodiment, the first and second partition plate portions 302, 303 are formed integrally with the surrounding wall 301.

The first primary winding unit 31 surrounds the first spool part 311 and passes through the notches 304 to surround the second spool part 312 of the spool 30 so as to wind around the entire length of the surrounding wall 301 of the spool 30 without being restricted by the first and second partition plate portions 302, 303. Preferably, each of the first and second partition plate portions 302, 303 has an end 302a, 303a that has a thickness smaller than the remaining parts of a respective one of the first and second partition plate portions 302, 303. The first and second partition plate portions 302, 303 have inclined faces at the ends 302a, 303a thereof to ensure that the first primary winding unit 31 can pass smoothly through the notches 304. The first secondary winding unit 33 and the second secondary winding unit 34 are disposed side-by-side along the spool axis (A), and are disposed on an outer side of the first primary winding unit 31 and surround the first and second spool parts 311, 312 of the surrounding wall 301 of the spool 30, respectively. The first primary winding unit 31 is thus disposed between the surrounding wall 301 of the spool 30 and the first and second secondary winding units 33, 34.

The iron core is to be extended into the surrounding wall 301 of the spool 30, and can be any one of the following: EE type iron core, EC type iron core, EF type iron core, ER type iron core, PQ type iron core, EER type iron core, EFD type iron core, ERL type iron core and PM type iron core. Since the feature of this invention does not reside in the iron core, further details of the same are omitted herein for the sake of brevity.

The first isolating unit 361 is disposed between the first primary winding unit 31 and the first secondary winding unit 33 to separate the first primary winding unit 31 from the first secondary winding unit 33. The second isolating unit 362 is disposed between the first primary winding unit 31 and the second secondary winding unit 34 to separate the first primary winding unit 31 from the second secondary winding unit 34.

The first and second isolating units 361, 362 are tubular and may be realized using insulation tape or dielectric material such as plastic. In this embodiment, the first isolating unit 361 is sleeved on the outer side of the first primary winding unit 31 such that the first primary winding unit 31 is confined between the first spool part 311 and the first isolating unit 361. The second isolating unit 362 is sleeved on the outer side of the first primary winding unit 31 such that the first primary winding unit 31 is confined between the second spool part 312 and the second isolating unit 362.

Figure 4C:
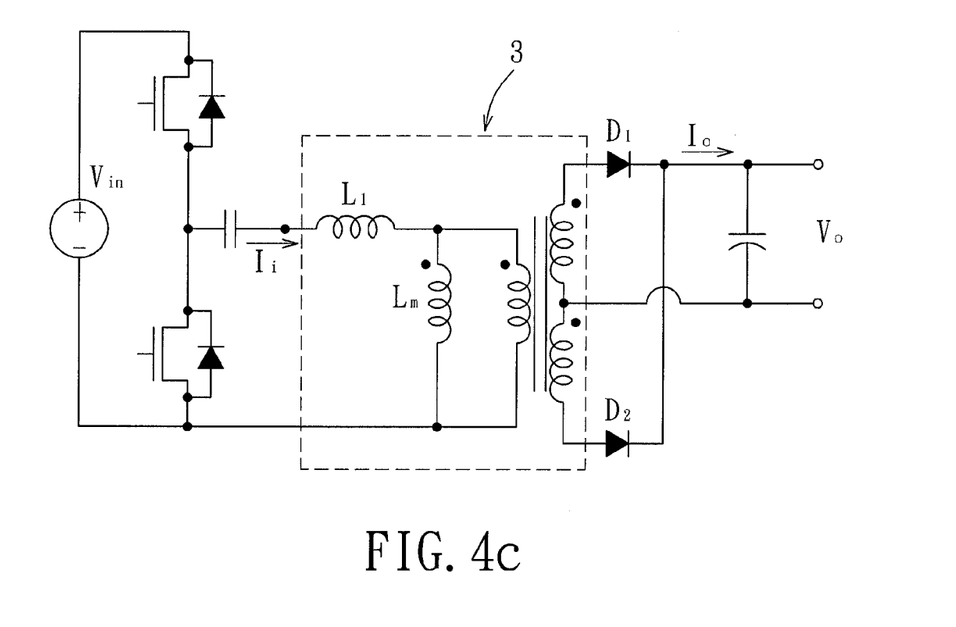
FIG. 4c is a circuit diagram of an asymmetric half-bridge LLC circuit including the first preferred embodiment.
Figure 4D:
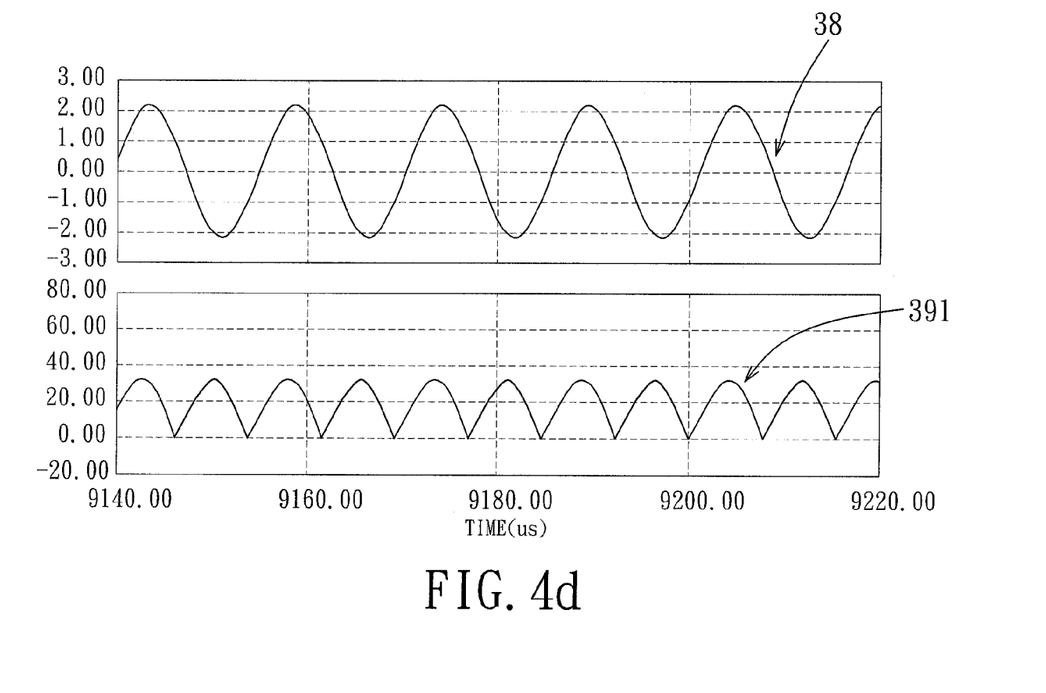
FIG. 4d illustrates input and output current waveforms in the asymmetric half-bridge LLC circuit of FIG. 4c.

FIG. 4c is a circuit diagram of an asymmetric half-bridge LLC circuit including the first preferred embodiment. FIG. 4d illustrates waveforms of input and output currents in the asymmetric half-bridge LLC circuit of FIG. 4c. When a sinusoidal current ($I_i$) (such as the waveform 38 in FIG. 4d) is inputted into the transformer 3, compared to the waveform 101 in FIG. 2d, since the leakage inductance ($L_1$) of the first primary winding unit 31 (see FIG. 4a) does not vary with changes in the input current ($I_i$), the waveform 38 of the resonant current ($I_t$) closely resembles a pure sinusoidal wave. In addition, peak values of the output current ($I_o$) are uniform, and the waveform of the output current ($I_o$) is continuous (see the waveform 391 in FIG. 4d). As such, power loss of the circuit including the transformer 3 is less, and efficiency is higher.

In the first preferred embodiment of this invention, apart from ensuring that the leakage inductance ($L_1$) of the first primary winding unit 31 is maintained at a certain level under different working states, the thickness of the first and second partition plate portions 302, 303 can be adjusted according to a requirement of the circuit application, such that the distance between the first and second secondary winding units 33, 34 is adjusted so as to obtain the requisite leakage inductance. The center-tapped transformer 3 therefore has a wide range of applications.

Figure 5:
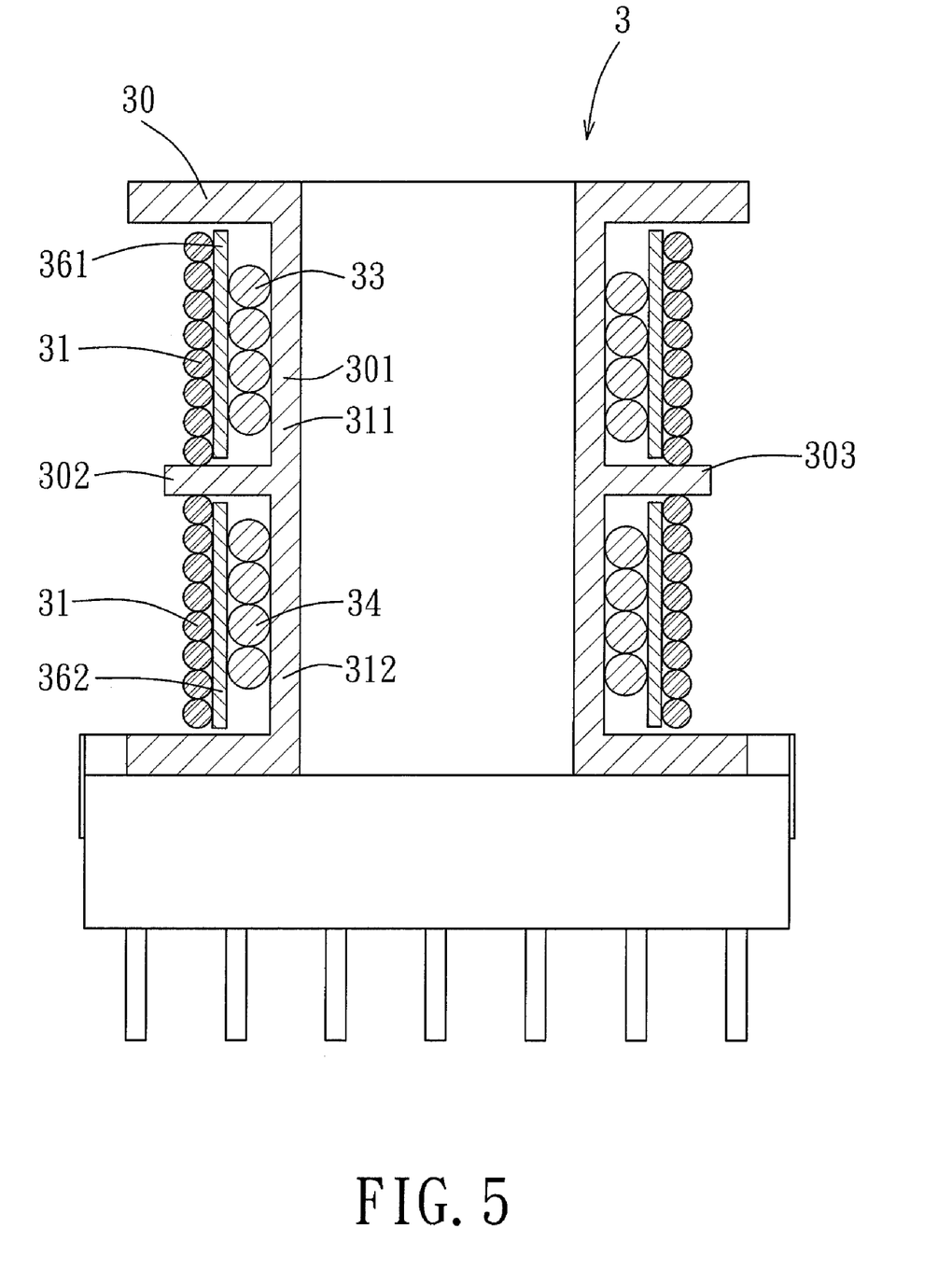
FIG. 5 is a sectional diagram of the second preferred embodiment of a center-tapped transformer according to the present invention.

Referring to FIG. 5, the second preferred embodiment of a center-tapped transformer 3 according to this invention is shown. The main difference between the second embodiment and the first embodiment resides in the following. In this embodiment, the first and second secondary winding units 33, 34 are disposed between the surrounding wall 301 and the first primary winding unit 31 and surround the first and second spool parts 311, 312 of the spool 30, respectively and are separated from each other by the first and second partition plate portions 302, 303. The first isolating unit 361 is sleeved on an outer side of the first secondary winding unit 33 such that the first secondary winding unit 33 is confined between the first spool part 311 and the first isolating unit 361. The second isolating unit 362 is sleeved on an outer side of the second secondary winding unit 34 such that the second secondary winding unit 34 is confined between the second spool part 312 and the second isolating unit 362.

Like the first preferred embodiment, the leakage inductance of the first primary winding unit 31 is maintained at a certain level under different working states, and the thickness of the first and second partition plate portions 302, 303 can be adjusted according to the leakage inductance required by a circuit application.

Figure 6:
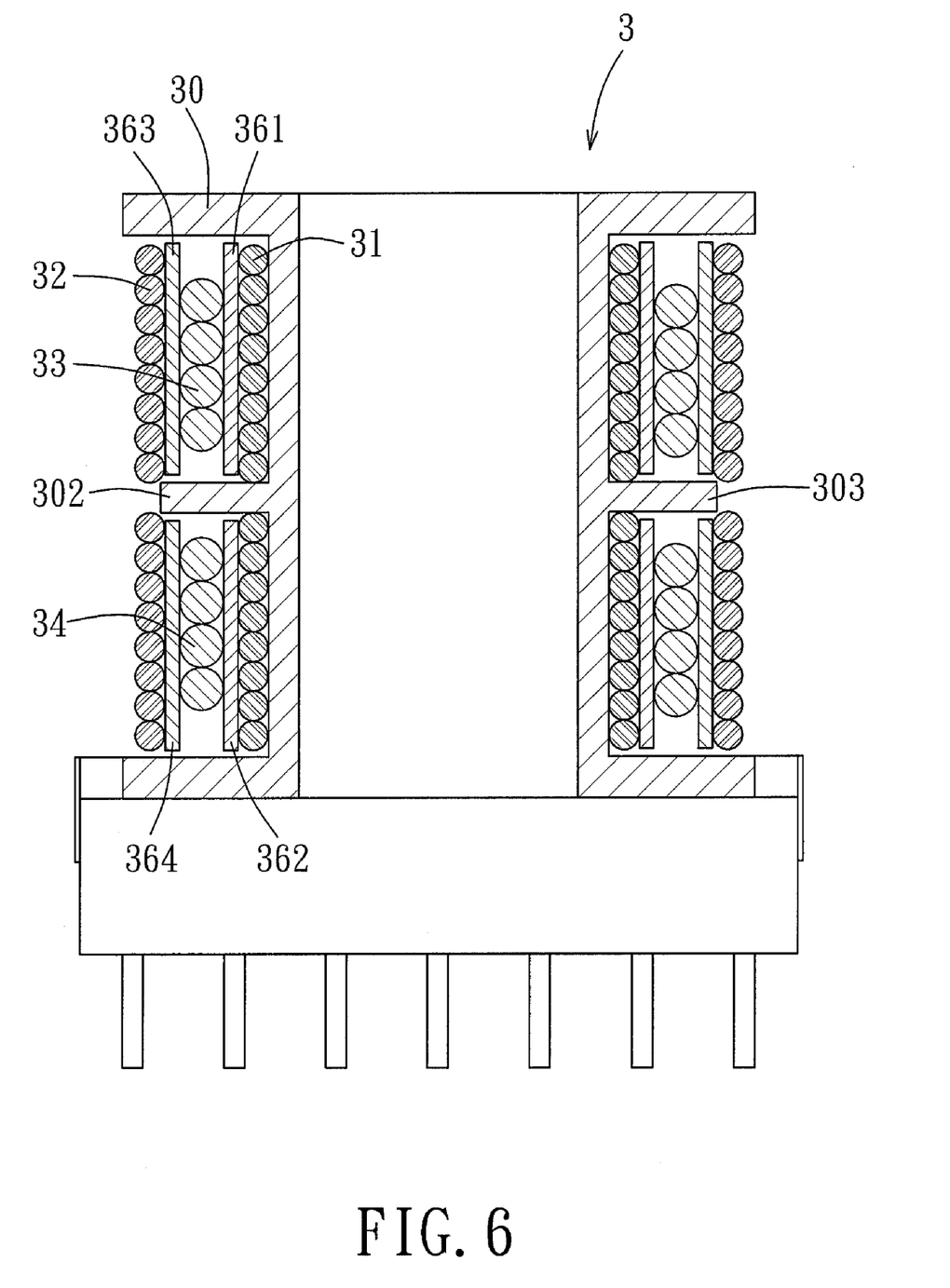
FIG. 6 is a sectional diagram of the third preferred embodiment of a center-tapped transformer according to the present invention.

Referring to FIG. 6, the third preferred embodiment of a center-tapped transformer 3 according to this invention is shown. The main difference between the third embodiment and the first embodiment resides in the following. Compared to the first preferred embodiment, the center-tapped transformer 3 of this embodiment further comprises a second primary winding unit 32, a tubular third isolating unit 363, and a tubular fourth isolating unit 364. In this embodiment, the first, second, third, and fourth isolating units 361, 362, 363, 364 are made of the same insulating material.

The second primary winding unit 32 surrounds the first and second secondary winding units 33, 34. The third isolating unit 363 is sleeved on the outer side of the first secondary winding unit 33, and is disposed between the first secondary winding unit 33 and the second primary winding unit 32. The first secondary winding unit 33 is thus confined between the third isolating unit 363 and the first isolating unit 361. The fourth isolating unit 363 is sleeved on the outer side of the second secondary winding unit 34, and is disposed between the second secondary winding unit 34 and the second primary winding unit 32. The second secondary winding unit 34 is thus confined between the fourth isolating unit 364 and the second isolating unit 362. The second primary winding unit 32 surrounds the third and fourth isolating units 363, 364 of the spool 30 and passes through the notches 304 (see FIG. 4b) to wind around the third and fourth isolating units 363, 364 without being restricted by the first and second partition plate portions 302, 303.

The third preferred embodiment is suited for applications that require a large turn number for the primary winding, or that require a relatively small leakage inductance for the primary winding unit. Like the first and second preferred embodiments, the leakage inductance of each of the first and second primary winding units 31, 32 is maintained at a certain level under different working states, and the thickness of the first and second partition plate portions 302, 303 can be adjusted according to the leakage inductance required by a circuit application.

Figure 7:
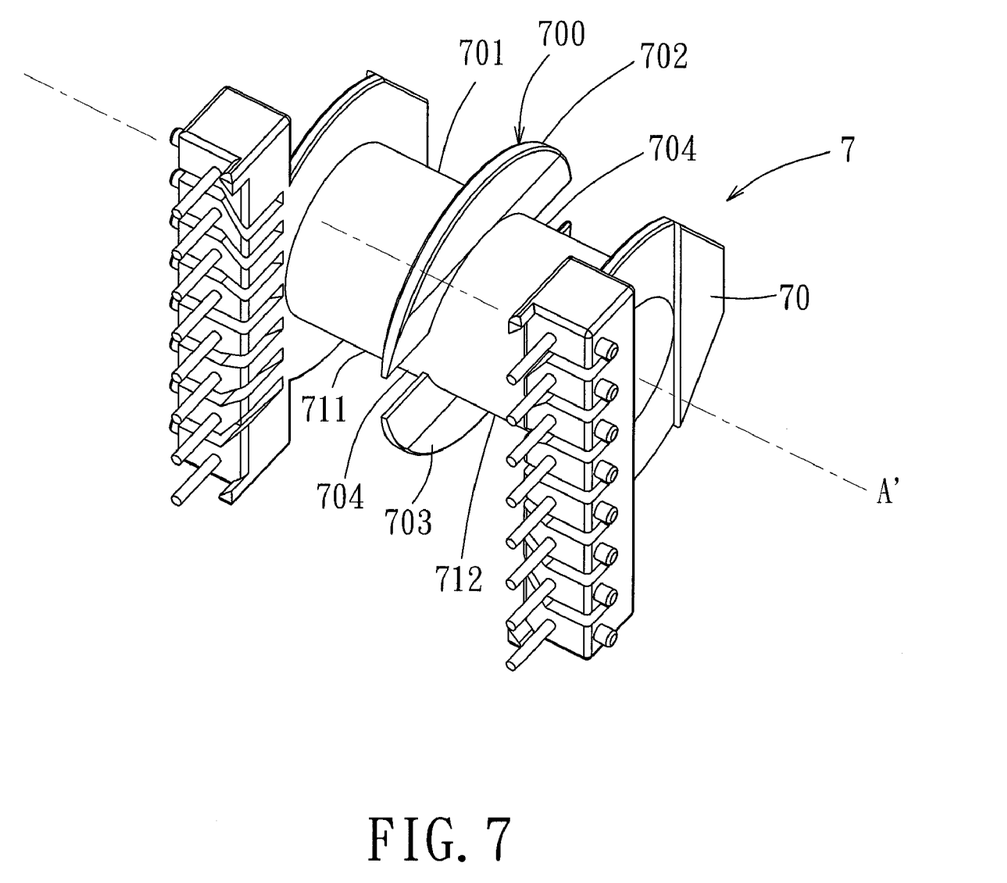
FIG. 7 is a perspective view of a spool of a fourth preferred embodiment of a center-tapped transformer according to the present invention.

Referring to FIG. 7, the fourth preferred embodiment of a center-tapped transformer 7 according to this invention is shown. The main difference between the fourth embodiment and the first embodiment resides in that the center-tapped transformer 7 includes a horizontal spool 70. The spool 70 has a surrounding wall 701 that defines a spool axis (A'), and a partition plate unit 700 that extends in radial outward directions from the surrounding wall 701 so as to divide the spool 70 into axially extending first and second spool parts 711, 712. The partition plate unit 700 has first and second partition plate portions 702, 703 cooperating with the surrounding wall 701 to define a pair of notches 704 and surrounding a middle part of the surrounding wall 701 of the spool 70, and is disposed transverse to an outer wall surface of the surrounding wall 701. The first primary winding unit 31 (see FIG. 4a) surrounds the first and second spool parts 711, 712 of the spool 70 and passes through the notches 704 to wind around the entire length of the surrounding wall 701 of the spool 70 without being restricted by the first and second partition plate portions 702, 703. The first and second partition plate portions 702, 703 have inclined faces at two ends thereof to ensure that the first primary winding unit 31 can pass smoothly through the notches 704. It should be noted that the second and third preferred embodiments (see FIGS. 5 and 6) of this invention may be modified to include the horizontal spool 70 of the fourth preferred embodiment.

Some of the advantages of this invention are summarized below:

1. Taking the embodiment of FIG. 4a as an example, since the first and second secondary winding units 33, 34 have the same positional relationship relative to the first primary winding unit 31 and the iron core (not shown) in the spool 30, when a sinusoidal current is inputted into the first primary winding unit 31, the leakage inductance is maintained at a certain level under different circuit working states.

2. Taking the embodiment of FIG. 5 as an example, through adjustment of the thickness of the first and second partition plate portions 302, 303 that separate the first and second secondary winding units 33, 34 from each other, the leakage inductance of the first primary winding unit 31 is adjusted, thereby rendering the center-tapped converters of this invention suitable for a wide range of applications.

3. By using the leakage inductance of the center-tapped of this invention for resonance inductance of transformers of LLC type, LC type, etc., additional inductors to serve as resonance inductance are not needed, thereby reducing transformer power loss and saving space.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A center-tapped transformer comprising:
    a spool having a surrounding wall that defines a spool axis, and a partition plate unit that extends in radial outward directions from said surrounding wall so as to divide said spool into axially extending first and second spool parts;
    a first primary winding unit surrounding said first spool part and passing through a pair of notches to surround second spool part ; and
    first and second secondary winding units disposed on one side of said first primary winding unit and surrounding said first and second spool parts, respectively;
    wherein said partition plate unit has first and second partition plate portions that cooperate with said surrounding wall to define said pair of notches, whereby adjusting the thickness of said first and second partition plate portions adjusts leakage inductance of said first primary winding unit;
    wherein each of said first and second partition plate portions has an end that has a thickness smaller than the remaining parts of a respective one of said first and second partition plate portions to ensure that said first primary winding unit can pass through said notches smoothly.

2. The center-tapped transformer as claimed in claim 1, wherein said first and second partition plate portions are formed integrally with said surrounding wall.

3. The center-tapped transformer as claimed in claim 1, wherein said first secondary winding unit and said second secondary winding unit are disposed side-by-side along the spool axis.

4. The center-tapped transformer as claimed in claim 1, further comprising:
    a first isolating unit disposed between said first primary winding unit and said first secondary winding unit; and
    a second isolating unit disposed between said first primary winding unit and said second secondary winding unit.

5. The center-tapped transformer as claimed in claim 4, wherein said first primary winding unit is disposed between said surrounding wall of said spool and said first and second secondary winding units.

6. The center-tapped transformer as claimed in claim 4, wherein said first secondary winding unit and said second secondary winding unit are disposed between said surrounding wall and said first primary winding unit.

7. The center-tapped transformer as claimed in claim 5, further comprising a second primary winding unit surrounding said first and second secondary winding units.

8. The center-tapped transformer as claimed in claim 7, further comprising:

a third isolating unit disposed between said first secondary winding unit and said second primary winding unit; and a fourth isolating unit disposed between said second secondary winding unit and said second primary winding unit;

said first secondary winding unit being confined between said third isolating unit and said first isolating unit;

said second secondary winding unit being confined between said fourth isolating unit and said second isolating unit.

* * * * *